Feb. 5, 1935.  G. L. DIMMICK  1,989,973
APPARATUS FOR RECORDING ELECTRICAL IMPULSES
Filed May 9, 1932
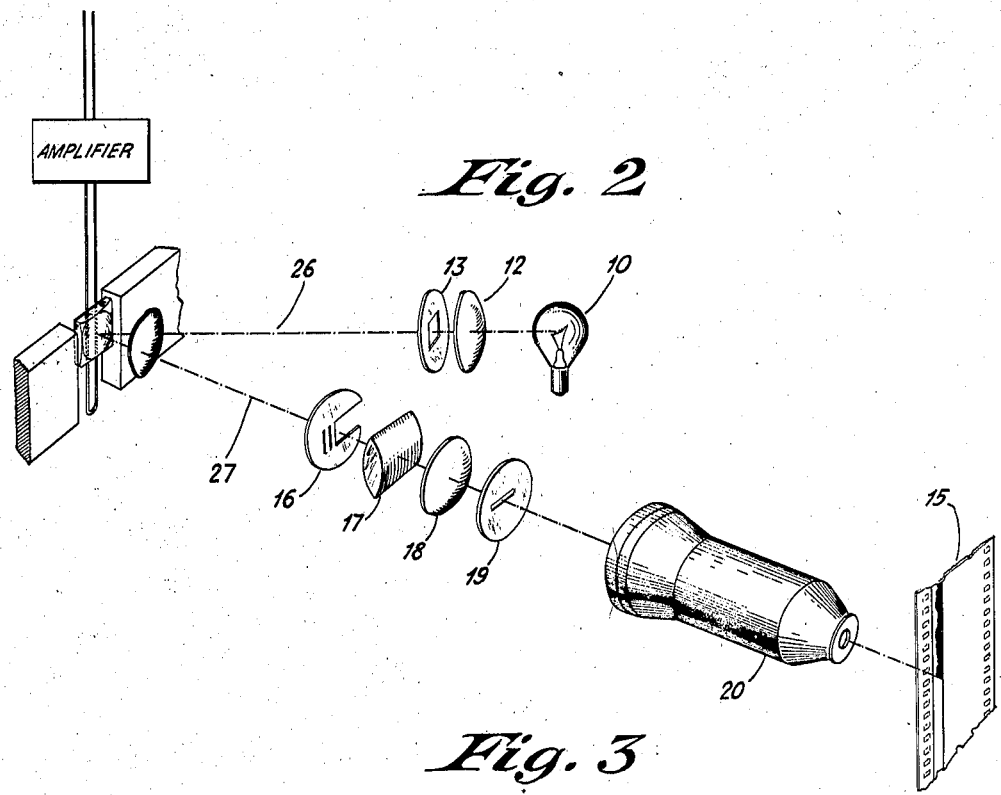
INVENTOR
G. L. DIMMICK
BY
ATTORNEY Patented Feb. 5, 1935

1,989,973

UNITED STATES PATENT OFFICE 1,989,973

APPARATUS FOR RECORDING ELECTRICAL IMPULSES

Glenn L. Dimmick, Westmont, N. J., assignor to Radio Corporation of America, a corporation of Delaware Application May 9, 1932, Serial No. 610,300

5 Claims. (Cl. 179—100.3)

This invention relates to apparatus for recording electrical impulses, and more particularly to an improved apparatus of the galvanometer type including means for producing a clear and distinct beam of light.

The galvanometer type of recorder is well known. It usually includes a flat mirror arranged to be vibrated in accordance with the impulses to be recorded. A light beam projected on this mirror is reflected through a suitable optical system to a light sensitive recording strip which is moved transversely of the reflected vibrating beam. Under these conditions, a photographic record of a width varying in accordance with the amplitude of the recorded impulses is produced.

In the use of this type of apparatus as heretofore constructed, difficulty has been encountered due to the fact that secondary images are reflected from the front and back surfaces of the flat mirror, thus decreasing the definition and intensity of the recording beam. In accordance with the present invention, this difficulty is avoided by the provison of a mirror having a curved surface whereby the formation of such secondary images is prevented.

The principal object of the present invention is the provision of means for producing a clear cut light image at the recording point.

A further object is the provision of an improved galvanometer mirror.

The invention will be better understood from the following description when considered in connection with the accompanying drawing, and its scope will be pointed out in the appended claims.

Referring to the drawing,

Fig. 1 illustrates an improved form of galvanometer mirror,

Fig. 2 is a diagrammatic illustration of a recording apparatus wherein this mirror has been embodied, and Fig. 3 is an explanatory diagram showing how secondary images are produced by the type of galvanometer mirror heretofore utilized.

The apparatus illustrated by Fig. 2 includes a light source 10 from which light is projected to a mirror 11 through a lens 12, a light stop 13 and a lens 14. Light is reflected from the mirror 11 to a light sensitive record 15 through the lens 14, a gauge 16, a cylindrical lens 17, a spherical lens 18, a light slit 19, and an objective 20. As illustrated more particularly in Fig. 1, the mirror 11 is provided with a convex surface 21 and with a plane surface 22 upon which the reflecting material may be mounted. It is, of course, apparent that the use of the mirror 11 is not limited to the particular apparatus in connection with which it has been illustrated but may be utilized in other types of apparatus which include a mirror vibrated or moved in accordance with the impulses to be recorded or observed.

As shown by Fig. 3, the flat mirror 23 which has been used heretofore in the galvanometer type of apparatus produces the secondary images indicated by the dotted lines 24 and 25, the image 24 being due to the reflection of the incident beam 26 from the front surface of the mirror, and the image 25 being due to the reflection of the incident beam from the back surface of the mirror. The plano-convex mirror 11 prevents the formation of the secondary images 24 and 25 and increases the useful light of the recording beam 27 due to the fact that the reflection from the front surface acts like the reflection from a convex mirror and thus prevents the formation of real images in space. It enables the stray light to be reduced because of the elimination of the two glass-air surfaces and increases the useful light of the image. Due to the smaller portion of the spherical surface used on the lens-mirror as compared to that which would be used on a window lens in front of a plane mirror, better images are produced by it.

For convenience in expression the mirror 11 is hereinafter designated as a lens mirror. As will be readily understood by those skilled in the art, only a slight degree of curvature is required to prevent the formation of secondary images. The most desirable degree of curvature will, of course, depend somewhat on the circumstances under which the apparatus is to be used.

Having thus described my invention, what I claim is:

1. The combination of a plano-convex mirror having a reflecting surface upon its rearward, plano side, means for applying a beam of light to said mirror, and means for focusing the reflection of said beam.

2. The combination of a lens-mirror having a plano, reflecting rear surface and a convex front surface and arranged to be vibrated in accordance with electrical impulses, means for applying a beam of light to said mirror, a light sensitive record, and means for focusing the reflected image of said beam at said record.

3. An audio impulse recorder including a plano-convex mirror having a reflecting, plano surface and a convex front surface and arranged to be moved in accordance with the impulses to be recorded, means for applying a beam of light to said mirror, a light sensitive record, and means for forcusing the reflected image of said beam at said record.

4. An audio impulse recorder including a plano-convex mirror having a reflecting, plano surface and a convex forward surface to prevent the formation of secondary images, means for vibrating said reflector laterally of the direction of motion of a soundtrack in accordance with the audio impulses to be recorded, means for applying a beam of light to said mirror, a light sensitive record, and means for focussing a reflected image of said beam at said record.

5. A galvanometer mirror composed of a transparent medium having a plano, reflecting surface and a convex front surface, whereby said mirror has a converging power without the formation of secondary images.

GLENN L. DIMMICK.